United States Patent [19]

Timossi et al.

[11] Patent Number: 4,965,777
[45] Date of Patent: Oct. 23, 1990

[54] VERY-HIGH-PRESSURE TRANSDUCER, PARTICULARLY FOR DETECTING THE PRESSURE OF A HYDRAULIC FLUID

[75] Inventors: Gian Maria Timossi, Piacenza; Giuseppina Rossi, Travacò Siccomario; Dell'Orto, Milan, all of Italy

[73] Assignee: Marelli Autronica S.p.A., Milan, Italy

[21] Appl. No.: 382,593

[22] Filed: Jul. 21, 1989

[30] Foreign Application Priority Data

Jul. 21, 1988 [IT] Italy .................................. 67689 A/88

[51] Int. Cl.$^5$ ........................................... H04R 17/00
[52] U.S. Cl. ..................................... 367/140; 73/721; 73/727; 310/328
[58] Field of Search .................. 367/140; 73/721, 727; 310/328

[56] References Cited

U.S. PATENT DOCUMENTS

| | | | |
|---|---|---|---|
| 4,129,042 | 12/1978 | Rosvold | 73/727 |
| 4,168,630 | 9/1979 | Shirouzu et al. | 73/727 |
| 4,373,399 | 2/1983 | Beloglazov et al. | 73/727 |
| 4,399,707 | 8/1983 | Wamstad | 73/727 |
| 4,411,158 | 10/1983 | Schaff, Jr. | 73/721 |
| 4,516,430 | 5/1985 | Kurtz et al. | 73/727 |
| 4,683,755 | 8/1987 | Samek | 73/727 |
| 4,726,233 | 2/1988 | Eckardt et al. | 73/727 |
| 4,732,044 | 3/1988 | Dell'Acqua et al. | 73/721 |

Primary Examiner—Charles T. Jordan
Assistant Examiner—J. Woodrow Eldred
Attorney, Agent, or Firm—Sughrue, Mion, Zinn, Macpeak & Seas

[57] ABSTRACT

The transducer comprises a support structure carrying piezoresistive sensors, particularly of the thick-film type, which are intended to be resiliently deformed by the fluid pressure to be measured and to provide an electrical signal indicative of the value of the pressure. The support structure comprises a substantially mushroom-shaped metal body with a head and a shank. An axial blind hole is formed in the shank and is intended to contain the fluid whose pressure is to be measured. The hole also extends into the head and, with the end surface of the head, defines a wall which is resiliently deformable by the pressure to be measured. The piezoresistive sensors are connected to the end surface of the head of the mushroom-shaped body in correspondence with or adjacent the deformable wall so that they can in turn be deformed as a result of the deformation of the wall. The piezoresistive sensors are deposited on a thin plate fixed to the upper surface of the head of the mushroom-shaped body. The plate also carries the components of the circuits for amplifying and processing the signals generated by the sensors. A metal structure is also connected to the mushroom-shaped body to screen it from radio-frequency interference.

5 Claims, 2 Drawing Sheets

VERY-HIGH-PRESSURE TRANSDUCER, PARTICULARLY FOR DETECTING THE PRESSURE OF A HYDRAULIC FLUID

BACKGROUND OF THE INVENTION

The present invention relates to a pressure transducer, particularly for use in motor vehicles for detecting the pressure of a hydraulic fluid, comprising a support structure carrying at least one piezoresistive sensor, particularly of the thick-film type, which is intended to be deformed resiliently by the fluid pressure to be measured and to provide an electrical signal indicative of the value of the pressure.

SUMMARY OF THE INVENTION

The object of the present invention is to produce a very-high-pressure transducer of the type indicated above, which enables the detection of very high pressures of the order of or greater than 1000 bars, for example, for measuring the fuel pressure in a direct-injection diesel engine.

According to the invention, this object is achieved by means of a very-high-pressure transducer of the type specified above, whose main characteristic lies in the fact that the support structure comprises a substantially mushroom-shaped metal body having a head and a shank in which an axial blind hole is formed for containing the fluid whose pressure is to be detected; the hole extending into the head and defining, with the upper surface of the head, a wall which is resiliently deformable by the pressure to be measured; the at least one piezoresistive sensor being connected to the end surface of the head of the mushroom-shaped body in correspondence with or adjacent the deformable wall, so that it can in turn be deformed as a result of the deformation of the wall.

The transducer preferably includes a plurality of piezoresistive sensors which are interconnected so as to form a bridge circuit. Moreover, the sensors are conveniently deposited by a silk-screen printing technique on a thin plate fixed to the upper surface of the head portion of the mushroom-shaped body by a layer of vitreous glue.

To advantage, the plate also carries the components of a circuit for amplifying and processing the signals generated by the piezoresistive sensors in operation.

A metal screening structure is also conveniently connected to the mushroom-shaped body and surrounds the piezoresistive sensors and the circuits for amplifying and processing the signals in order to eliminate the effects of radio-frequency interference.

BRIEF DESCRIPTION OF THE DRAWINGS

Further characteristics and advantages of the very-high-pressure transducer according to the invention will become clear from the detailed description which follows with reference to the appended drawings, provided by way of non-limiting example, in which.

DETAILED DESCRIPTION OF THE DRAWINGS

Figure 1:
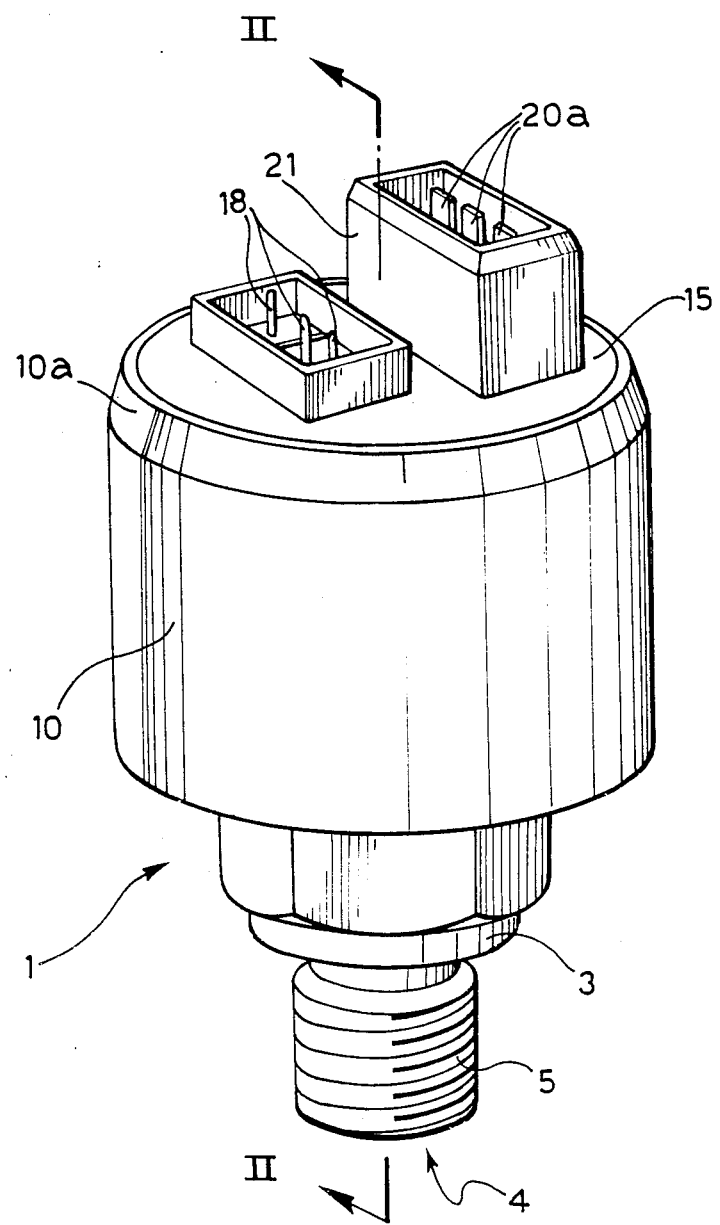
FIG. 1 is a perspective view of one embodiment of the transducer according to the invention.

The very-high-pressure transducer shown in the drawings comprises a substantially mushroom-shaped metal body 1 with a circular head 2 and a shank 3.

Figure 2:
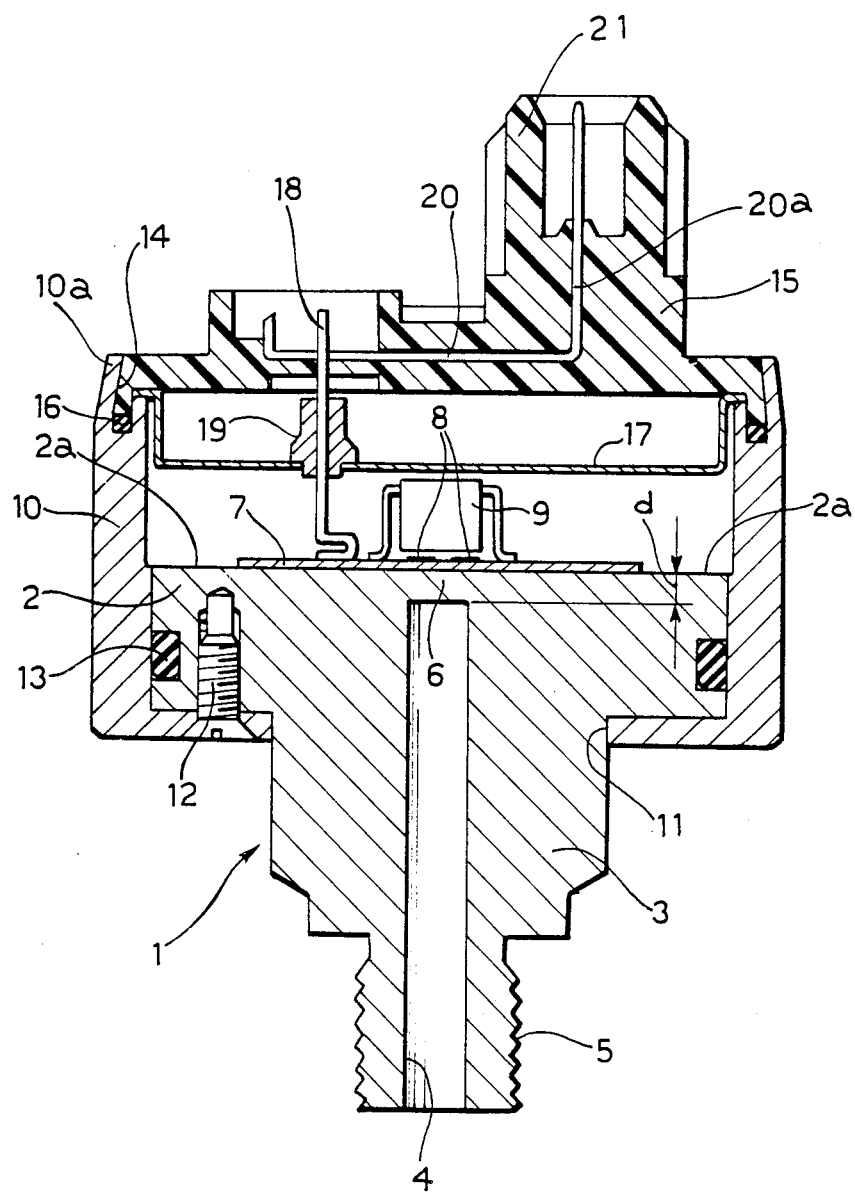
FIG. 2 is an axial section taken on the line II—II of FIG. 1.

As can be seen in FIG. 2, an axial blind hole 4 is formed in the shank 3 and also extends partly into the head 2, ending a predetermined distance d from the flat, upper end surface 2a of the head.

The lower end portion of the shank 3 has external threading 5 which enables it to be coupled to a tube or an opening of a chamber containing the hydraulic fluid whose pressure is to be measured.

A wall 6 is defined between the end surface of the hole 4 which is intended to contain the fluid and the upper surface 2a of the head 2 (FIG. 2) and is resiliently deformable by the pressure to be measured.

The upper face of a plate of electrically insulating material, for example ceramics (alumina), indicated 7, carries thick-film resistors 8 which are deposited by known silk-screen printing techniques. The thick-film resistors are conveniently interconnected electrically so as to form a bridge circuit, and are deposited on a central portion of the plate 7. On the same face, the plate 7 carries the components 9 of a circuit for supplying, amplifying and processing the signals generated by the thick-film resistors 8 in operation.

The plate 7 is fixed to the upper surface 2a of the head 2 of the body 1 by the interposition of a layer of vitreous glue, so that the thick-film resistors are located in correspondence with or adjacent the wall 6 (FIG. 2).

In operation, the wall 6 is deformed to an extent dependent on the pressure of the fluid introduced into the hole 4. This deformation causes a corresponding deformation of the plate 7 and the thick-film resistors 8. The corresponding variation in the resistance of the resistors enables the generation of an electrical signal indicative of the value of the pressure of the fluid introduced into the hole 4.

A substantially cup-shaped body is indicated 10 and has a base wall with a central aperture, indicated 11 in FIG. 2. The body is conveniently made of metal, particularly aluminium, and is arranged around the head portion 2 of the body 1 so that the shank 3 extends through its aperture 11. The body 10 is fixed to the body 1 by means of screws 12 (only one of which is visible in FIG. 2). A sealing ring 13 is clamped between the body 10 and an annular circumferential groove in the head portion 2 of the body 1.

In the embodiment illustrated, the side wall of the body 10 extends beyond the upper end surface 2a of the head 2 of the body 1. The upper end edge of the side wall of the body 10 has a groove 14, in the bottom of which a sealing ring 16 is positioned and in which the circumferential edge of a cover element, indicated 15, is then engaged. A metal diaphragm 17 is gripped between the cover element 15 and the body 10 and extends over the plate 7 and the components fitted thereto. The diaphragm acts as a screen against radio-frequency interference: together with the body 10 and the body 1, it forms a closed structure which encloses the piezoresistive sensors 8 and the associated circuits for supplying, amplifying and processing the signals.

The cover element 15 is connected to the body 10 by the upsetting of the outer edge part 10a of the top of the side wall of the body, as can be seen in particular in FIG. 2.

The electrical supply of the piezoresistive sensors 8 and the associated circuits carried by the plate 7 and the picking up of the signals generated thereby take place through rod-shaped conductor terminals 18 (FIG. 2) having respective bent lower ends connected to the circuits carried by the plate 7. The conductive terminals 18 extend through insulating elements 19 located in apertures in the diaphragm 17 and then pass through the cover element 15 so as to be accessible from the outside. The elements 19 insulate the terminals 18 from the diaphragm 17, forming circular coupling capacitors therewith.

In the embodiment illustrated, shaped conductor blades 20 connected to the conductive terminals 18 extend through the cover element 15 and have respective arms 20a which extend within a quadrangular annular projection 21 integral with the cover element 15, forming therewith an electrical connector.

Naturally, the connecting terminals of the transducer may be made in many different ways from that illustrated by way of non-limiting example in the appended drawings.

As stated above, in operation, the pressure of the fluid introduced into the hole 4 causes the deformation of the wall 6 and a corresponding deformation of the piezoresistive sensors 8 which cause the generation of an electrical signal indicative of the pressure of the fluid.

The wall 6 conveniently has a thickness d which is somewhat less than the general thickness of the head 2 so that, in practice, the deformation due to the pressure is localised just in correspondence with the portion 6 of the wall.

The very-high-pressure transducer according to the invention can easily be made so that it is usable for measuring pressures in various ranges of values. In particular, a different diameter of the hole 4 and a different thickness d of the wall 6 will correspond to each range of pressure values measurable.

In particular, the transducer enables the measurement of pressures of the order of or greater than 1000 bars. It can therefore be used, as already stated above, for measuring the fuel pressure in a direct-injection diesel engine.

The pressure transducer according to the invention may also conveniently be used in systems for the automatic control of motor vehicle suspensions.

Naturally, the principle of the invention remaining the same, the forms of embodiment and details of construction may be varied widely with respect to those described and illustrated purely by way of non-limiting example, without thereby departing from the scope of the present invention.

We claim:

1. A very-high-pressure transducer comprising a support structure carrying at least one piezoresistive sensor of the thick-film type adapted to be deformed resiliently by the fluid pressure to be measured and to provide an electrical signal indicative of the value of the pressure, the support structure comprising a metal body having an enlarged head and a reduced shank, an axial blind hole located in the shank for containing a fluid whose pressure is to be measured, the hole extending into the head and having an end surface spaced from an upper surface of the head to define a wall of integral one piece construction with the body which is resiliently deformable by the pressure to be measured; each piezoresistive sensor being connected to the upper surface of the head of the body in correspondence with the deformable wall so that said sensor can in turn be deformed as a result of the deformation of the wall.

2. A transducer according to claim 1, wherein each piezoresistive sensor is deposited on a thin plate glued to the upper surface of the head portion of the body.

3. A transducer according to claim 1, including a plurality of piezoresistive sensors.

4. A transducer according to claim 2, wherein the plate also carries the components of circuits for amplifying and processing the signals generated by the piezoresistive sensor in operation.

5. A transducer according to claim 4, wherein a metal screening structure is connected to the metal body and covers the piezoresistive sensor and the circuits for amplifying and processing the signals mounted on said body.

* * * * *